US012773837B2

(12) United States Patent
Viola et al.

(10) Patent No.: US 12,773,837 B2
(45) Date of Patent: Oct. 27, 2026

(54) MULTI-LAYER PHOTOTHERMAL TEXTILE AND WEARABLE

(71) Applicant: University of Massachusetts, Boston, MA (US)

(72) Inventors: Wesley Viola, Somerville, MA (US); Trisha L. Andrew, Hadley, MA (US)

(73) Assignee: University of Massachusetts, Westborough, MA (US)

( * ) Notice: Subject to any disclaimer, the term of this patent is extended or adjusted under 35 U.S.C. 154(b) by 611 days.

(21) Appl. No.: 18/308,524

(22) Filed: Apr. 27, 2023

(65) Prior Publication Data

US 2023/0347620 A1 Nov. 2, 2023

Related U.S. Application Data

(60) Provisional application No. 63/363,691, filed on Apr. 27, 2022.

(51) Int. Cl.
*B32B 5/26* (2006.01)
*B32B 3/28* (2006.01)
(Continued)

(52) U.S. Cl.
CPC ................ *B32B 5/275* (2021.05); *B32B 3/28* (2013.01); *B32B 5/022* (2013.01); *B32B 5/024* (2013.01);
(Continued)

(58) Field of Classification Search
CPC ............ B32B 2250/20; B32B 2255/02; B32B 2255/26; B32B 2262/0253; B32B 2262/0261; B32B 2307/302; B32B 2307/40; B32B 2437/00; B32B 3/28; B32B 5/022; B32B 5/024; B32B 5/073; B32B 5/275; B32B 5/277; B32B 2307/414; B32B 3/00; B32B 5/263; B32B 5/266;
(Continued)

(56) References Cited

U.S. PATENT DOCUMENTS

2012/0224247 A1* 9/2012 Sotzing .................. H01M 4/02 429/341

FOREIGN PATENT DOCUMENTS

CN 105040469 A * 11/2015
CN 110484980 A * 11/2019 ........... D01D 5/0084

OTHER PUBLICATIONS

Dual-Shell Photothermoelectric Textile Based on a PPy Photothermal Layer for Solar Thermal Energy Harvesting Xuefei Zhang, Ting-Ting Li, Hai-Tao Ren, Hao-Kai Peng, Bing-Chiuan Shiu, Yanting Wang, Ching-Wen Lou, and Jia-Horng Lin ACS Applied Materials & Interfaces 2020 12 (49), 55072-55082. (Year: 2020).*

(Continued)

*Primary Examiner* — Lynda Salvatore
(74) *Attorney, Agent, or Firm* — Schwegman Lundberg & Woessner, P.A.

(57) ABSTRACT

The disclosure provides a textile having a photothermal absorber layer, which comprises a conjugated polymer; and a transmissive layer, which comprises fibers that forward scatter incident visible light with a transmission of 60% or greater. The photothermal absorber layer can be nylon coated with a conjugated polymer, such as PEDOT. The transmissive layer can be a non-woven polypropylene material. The disclosure also provides wearables, such as a clothing, comprising such textile, and methods for making the same.

20 Claims, 7 Drawing Sheets

(51) Int. Cl.

| | |
|---|---|
| ***B32B 5/02*** | (2006.01) |
| ***B32B 5/06*** | (2006.01) |
| ***D06M 15/53*** | (2006.01) |
| ***D06M 23/06*** | (2006.01) |
| ***D06M 101/34*** | (2006.01) |

(52) U.S. Cl.
CPC .............. *B32B 5/073* (2021.05); *B32B 5/277* (2021.05); *D06M 15/53* (2013.01); *D06M 23/06* (2013.01); *B32B 2250/20* (2013.01); *B32B 2255/02* (2013.01); *B32B 2255/26* (2013.01); *B32B 2262/0253* (2013.01); *B32B 2262/0261* (2013.01); *B32B 2307/302* (2013.01); *B32B 2307/40* (2013.01); *B32B 2437/00* (2013.01); *D06M 2101/34* (2013.01)

(58) Field of Classification Search
CPC .. D06M 15/53; D06M 2101/34; D06M 23/06; D06M 15/63; D06M 23/16
See application file for complete search history.

(56) References Cited

OTHER PUBLICATIONS

Cai, L., “Warming up human body by nanoporous metallized polyethylene textile”, Nature communications, 8(1), pp. 1-8. 2017., (Sep. 17, 2017), 8 pgs.
Gi, K., “A global analysis of residential heating and cooling service demand and cost-effective energy consumption under different climate change scenarios up to 2050”, Mitigation and adaptation strategies for global change, 23(1), 51-79. 2016., (Dec. 19, 2016), 1 pg.
Peng, Y., “Advanced textiles for personal thermal management and energy”, Joule, 4(4), pp. 724-742. 2020., (Apr. 15, 2020), 19 pgs.
Pérez-Lombard, L., “A review on buildings energy consumption information”, Energy and buildings, 40(3), 394-398. 2008., (2008), 21 pgs.
Yin, Zhanxiang, et al., “Advances in integrated photo-thermal-electric energy conversion”, Chem. Commun., 2025, 61, 9157. 9157-9168.

* cited by examiner

*warmer textile maintains $T_{skin}$ =33°C at lower $T_{environment}$

MULTI-LAYER PHOTOTHERMAL TEXTILE AND WEARABLE

PRIORITY APPLICATION

This application claims priority to U.S. Provisional Patent Application Ser. No. 63/363,691, filed on Apr. 27, 2022, the disclosure of which is incorporated by reference herein in its entirety.

BACKGROUND

The textile is an ancient commodity that has served the core function of supporting thermal homeostasis. Yet, despite millennia of economic development, textile thermoregulation is still limited and is ill-equipped to meet the demands of environmental extremes.

Wearable technology has advanced rapidly to incorporate a host of novel functionalities into clothing and textiles, such as health surveying, motion tracking, environmental surveying, and sleep evaluation. The first wearable—the textile—has evolved little in how it performs its original, core function: thermoregulation. After thousands of years, thermoregulating textiles are typically prepared by weaving fibers into thick structures that manage heat transfer by inhibiting thermal conduction and convection from the body to the environment while maintaining breathability. With increasing environmental and economic pressures to find more sustainable ways of living in a rapidly changing climate, there is a need for new textiles.

SUMMARY OF THE INVENTION

The present disclosure provides a textile and wearables that are useful for thermoregulation. Wearables include articles of clothing, protective gear, accessories, and other items worn on a body.

The disclosure provides a textile comprising a photothermal absorber layer, which comprises a conjugated polymer; and a transmissive layer, which comprises fibers that forward scatter incident visible light with a transmission of 60% or greater The disclosure provides a wearable comprising a textile having a photothermal absorber body-facing layer, which comprises a conjugated polymer; and a transmissive outer-facing layer, which comprises fibers that forward scatter incident visible light with a transmission of 60% or greater.

The disclosure provides a method of making a textile, comprising a vapor film deposition of a conjugated polymer onto a first fabric; securing the first fabric to a second fabric, wherein the second fabric comprises fibers that forward scatter incident visible light and has a transmission of 60% or greater.

In various aspects, the textile and wearable have the advantage of offering both (i) a light-harvesting design for passively accepting solar or ambient light in the environment for the purposes of thermoregulation; and (ii) minimize heat loss. Surprisingly, these advantages are achieved in a textile form that is comfortably wearable: for example, the constituent fabrics can drape and are non-toxic. One source of such advantages is that the present disclosure can achieve an all-polymer material, that does not rely on metals or nanoparticles. Further advantages are that the textile can provide a flexible, lightweight, light-harvesting wearable that, while under illumination of 0.1 sun, which is accessible by indoor lighting, can achieve improved functional temperature range extending 10° C. lower than that of a simple cotton T-shirt while weighing 30% less. Prior attempts utilizing nanoparticles have not been fully successful: nanomaterials can be difficult to coat onto textiles, can provide poor wearability, and subsequent laundering can remove or destroy them. Certain nanomaterials are also known to be toxic and bio-persistent with safety concerns. A key advantage to this approach is that, unlike other thermoregulation strategies which rely on metallic or inorganic materials, the structure proposed here can be realized with all-polymer materials. Additionally, the light-harvesting textile and wearable described herein can provide a net environmental benefit by permitting thermoregulation by solar means or by ambient indoor lighting so as to reduce the reliance on fossil-fuel or energy inefficient heating systems.

BRIEF DESCRIPTION OF THE FIGURES

The drawings illustrate generally, by way of example, but not by way of limitation, various embodiments of the present invention.

DETAILED DESCRIPTION OF THE INVENTION

Figure 1A:
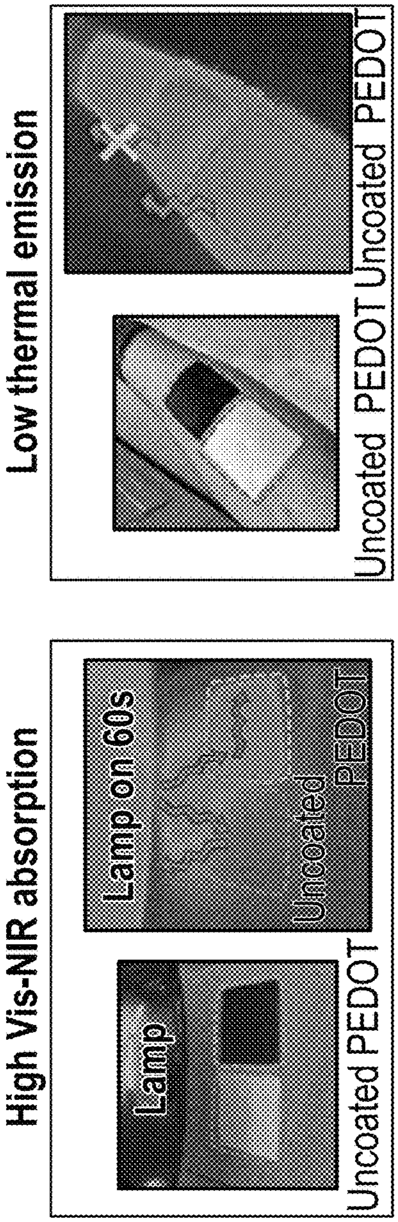
FIG. 1A-1B the optical absorption and emission profile of a material can be reversed by utilizing a conjugated polymer, such as PEDOT. Images are provided (a) comparing visible-NIR absorption and low thermal emission. Passive heating is achieved by absorbing strongly in the visible while not re-emitting heat in the infrared (low emissivity ER). The chart (b) plots emissivity of the coated fabric (gray) and uncoated (black) against wavelength.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

As used herein, the term "polymer" refers to a non-metal, non-nanoparticle molecule having at least one repeating unit and can include copolymers. In various contexts, a polymer is an organic polymer. Examples include polypropylene and nylon.

As used herein, the term "light" refers to electromagnetic radiation in the visible range and near-visible range. For example light can refer to electromagnetic radiation in the range of 10 nm to 1 mm, and can include ultraviolet, visible, near infrared, and infrared light.

As used herein, the term "visible light" is defined as light having a wavelength of from 380 nm to 750 nm. In some alternative examples, visible light can be greater than 380 nm up to 700 nm, or greater than 400 nm up to 700 nm.

As used herein, the term "near infrared light" or "NIR" is defined as light having a wavelength of greater than 750 nm up to 3000 nm. In some alternative examples, NIR light can be greater than 750 nm up to 2500 nm. In some aspects, NIR can refer to IR-A, IR-B, or both, as defined by the CIE.

As used herein, the term "infrared light" or "IR" is defined as light having a wavelength of greater than 3000 nm up to 20,000 nm. In some alternative examples, IR light can be greater than 3000 nm up to 5000 nm, greater than 3000 nm up to 10,000 nm, or greater than 3000 nm up to 15,000 nm. In some aspects, IR can refer to IR-C as defined by the CIE. In some aspects, IR can refer to mid-infrared or far-infrared per ISO 20473.

As used herein, the term "conjugated polymer" refers to a polymer having repeating monomer units that are in pi-conjugation with each other.

Emissivity (absorptivity) describes the efficiency in which a material absorbs light and emits thermal energy. It is defined as the fraction of energy being emitted relative to that emitted by a thermal black body. A black body is a material that is a perfect emitter of heat energy and has an emissivity value of 1. Thus, Emissivity is calculated as 100%−ρ. Emissivity differs across the electromagnetic spectrum, and can be calculated for a given wavelength or wavelengths. In some cases, emissivity can be calculated as an average across a range of wavelengths, which can be weighted according to varying intensity across wavelengths of the source spectrum. Transmissivity (τ) can be ascertained by as described herein using a FLIR detector. $\tau = T^4_{obj,apparent} - T^4_{amb} / T^4_{obj,real} - T^4_{amb}$. Transmissivity was subtracted from apparent emissivity to obtain the true emissivity. Finally, reflectivity (ρ) was calculated from true emissivity and transmissivity by Kirchhoff's law.

The present disclosure provides a textile, which has optical structures that can exhibit dramatically enhanced thermoregulation in an ultralightweight dual-layer fabric, while still retaining the qualities expected of traditional textiles. In various aspects, the textile utilizes thermoregulating structures and uses optical polymer materials to provide a wearable having an absorber-transmitter architecture.

The dual-layer includes a photothermal "absorber" layer having high (>60%) visible-NIR light absorbance and low (<60%) emission of infrared heat, and a transmissive layer having a high (>60%) visible-NIR light transmission. The transmissive layer can also offer low (<50%) emission or transmission of infrared heat and insulation. In various aspects, the transmissive layer can be referred to as a transparent or semi-transparent layer. The complementary optical functions in the absorber-transmitter can achieve outstanding thermoregulation. This dual-layer can be achieved using entirely organic polymer materials, without requiring use of metals, nanoparticles, photovoltaics, lithium-ion batteries, and the like. Each layer can be spectrally selective.

For example, the textile can have a photothermal absorber layer and a transmissive layer. The photothermal absorber layer can be oriented as a bottom layer or as an inner layer, when visualizing the textile as it would be placed upon a body. The transmissive layer is oriented as a top layer or as an outer layer, when visualizing the textile as it would be placed upon a body.

The photothermal absorber layer contains a conjugated polymer. The conjugated polymer can be a conductive polymer. Examples of conjugated polymer include poly (fluorene) s, polyphenylenes, polypyrenes, polyazulenes, polynaphthalenes, poly(pyrrole)s (PPY), polycarbazoles, polyindoles, polyazepines, polyanilines (PANI), poly(thiophene)s (PT), poly(3,4-ethylenedioxythiophene) (PEDOT), poly(p-phenylene sulfide) (PPS), poly(acetylene)s (PAC), and poly(p-phenylene vinylene) (PPV). In various aspects, the conjugated polymer is polythiophene. The conjugated polymer can be PEDOT.

The photothermal absorber layer includes a textile. The textile can be a woven textile or a non-woven textile and can be thermally conductive to facilitate photothermal heat transfer to the body. The textile can be a polymer. Examples of polymer textiles include acrylics, Kevlar, modacrylic, nomex, nylon (polyamides), polyester, spandex, rayon (viscose), PVC, and polypropylene. In various aspects, the photothermal absorber layer is a polyamide, such as 6,6-nylon or other nylons.

The conjugated polymer can be coated, e.g., by vapor deposition, or otherwise incorporated into the textile of the photothermal absorber layer. The textile of the photothermal absorber layer can be coated with approximately 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 micron thick coating of PEDOT. The textile of the photothermal absorber layer can be coated with at least 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 micron thick coating of PEDOT. The textile of the photothermal absorber layer can be coated with less than 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 micron thick coating of PEDOT.

The photothermal absorber layer comprising the conjugated polymer absorbs more photothermal energy, and emits less thermal energy, each relative to an otherwise equivalent photothermal absorber layer lacking the conjugated polymer. The photothermal absorber layer comprising the conjugated polymer absorbs more photothermal energy in the visible-NIR light region compared to the IR region.

The photothermal absorber layer has an emissivity across the visible range, NIR range, visible-NIR range, or subrange thereof, of at least, or about, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 99.5%. The subrange can be defined as starting from 380 nm, 390 nm, 400 nm, 410 nm, 420 nm, 430 nm, 440 nm, 450 nm, 460 nm, 470 nm, 480 nm, 490 nm, or 500 nm and ending at 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm. The photothermal absorber layer absorbs 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 99.5% of light in the visible range, NIR range, visible-NIR range, or subrange defined therein.

The photothermal absorber layer has an emissivity in the IR range, or subrange thereof, of less than or about 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, or less than or about 60%. The IR subrange can be defined as starting from 2500 nm, 3000 nm, 3500 nm, 4000 nm, 4500 nm, or 5000 nm and ending at 5500 nm, 6000 nm, 6500 nm, 7000 nm, 7500 nm, 8000 nm, 8500 nm, 9000 nm, 9500 nm, 10000 nm, or 20000 nm.

The transmissive layer has fibers that offer high transmission of visible and near infrared light and provides forward scattering of incident light. In various aspects, the transmissive layer can provide a transmission of incident light in the visible range, NIR range, visible-NIR range, or subrange thereof, of at least, or about, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 99.5%.

The transmissive layer can have an emissivity in the IR range, or subrange thereof, of less than or about 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, or less than or about 60%. The IR subrange can be defined as starting from 2500 nm, 3000 nm, 3500 nm, 4000 nm, 4500 nm, or 5000 nm and ending at 5500 nm, 6000 nm, 6500 nm, 7000 nm, 7500 nm, 8000 nm, 8500 nm, 9000 nm, 9500 nm, 10000 nm, or 20000 nm.

The transmissive layer includes a textile. The textile can be a non-woven textile, a polymer textile, or both. For example, the transmissive layer can be, or comprise, non-woven polypropylene. As a further example, the transmissive layer can be spun-bonded polypropylene.

The transmissive layer comprises two or more layers, which together provide one or more insulating chamber comprising air. For example, pleating, puffed air chambers, or other insulating air pockets.

The transmissive layer has low optical density fibers. The fibers permit high transmission of visible light, NIR light, or both. The fibers are not limited to a particular shape, but are typically spindle or rod shaped. In various aspects, the fibers are disorganized, but provide high transmission.

The fibers have a diameter of from about 1 microns to about 20 microns. For example, the fibers are about 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0 microns in diameter. In various example aspects, the fibers have a diameter of at least 1.0, 1.5, 2.0, 2.5, 3.0, 3.5, 4.0, 4.5, 5.0, 5.5, 6.0, 6.5, 7.0, 7.5, 8.0, 8.5, or 9.0 microns, and up to 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0 microns.

The textile can further comprise a phase change material. The phase change material can serve to store thermal energy. The phase change material can be included in the transmissive layer or the photothermal absorber layer. An example phase change material is a poly(ethylene glycol)-1000.

In various aspects, the textile is suitable for use in garments, apparel, upholstery, linens, window treatments, outdoor blankets, and portable shelters.

The disclosure also provides a wearable that incorporates or is prepared from the textile of the present disclosure. For example, the wearable can have a textile with a photothermal absorber body-facing layer, which comprises a conjugated polymer; and a transmissive outer-facing layer, which comprises fibers that forward scatter incident visible light with a transmission of 60% or greater.

The wearable can be in the form of a jacket, shirt, pants, snow suit, vest, poncho, gloves, or hat. The wearable can be in the form of winter wear.

The disclosure also provides a method of preparing a textile. The method includes vapor film deposition of a conjugated polymer onto a first fabric and securing the first fabric to a second fabric. The coated first fabric corresponds to a photothermal absorber body-facing layer and the second fabric corresponds to a transmissive layer. For example, the second fabric comprises fibers that forward scatter incident visible light and has a transmission of 60% or greater.

Figure 1B:
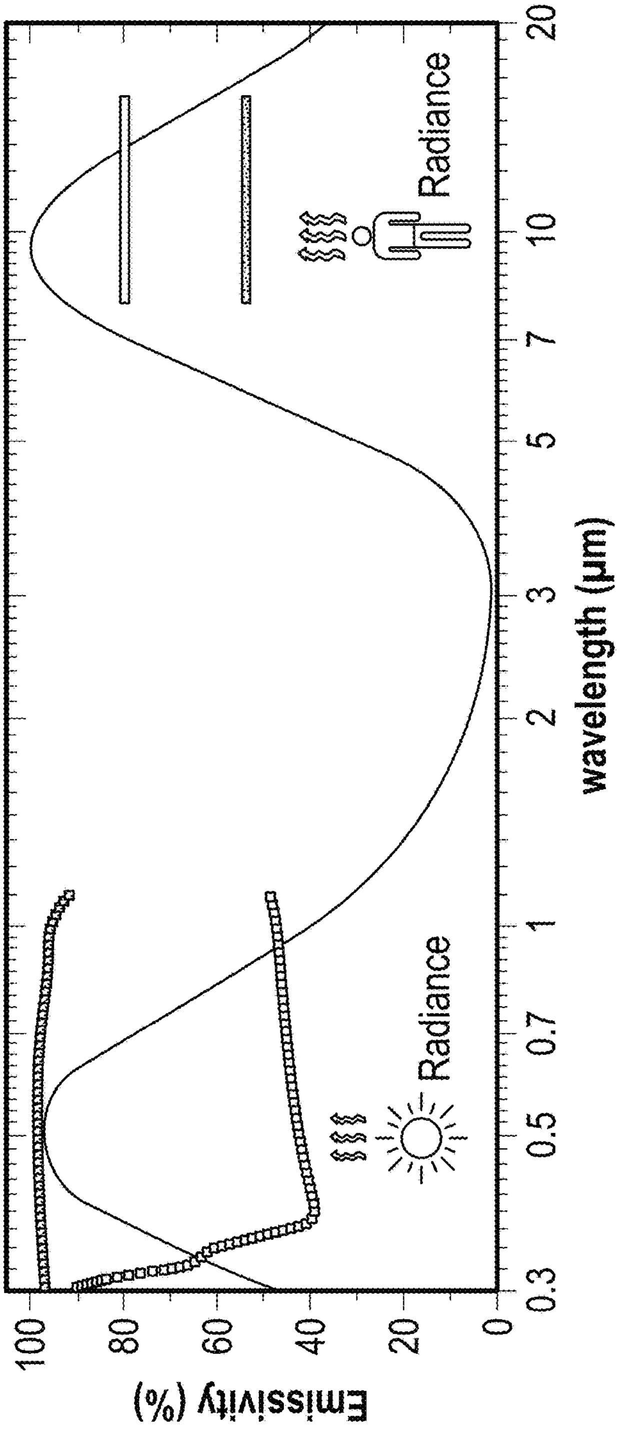

FIG. 1 illustrates the effect a conjugated polymer can have on visible-NIR absorption and thermal emission. FIG. 1A shows how a one-micron thick coating of PEDOT on nylon fabric can dramatically change the surface optical properties due to the high optical density of PEDOT. FIG. 1A visualizes this change in photographs and thermal images. Under a commercial lightbulb, the coated fabric absorbs more photothermal energy relative to the reflective uncoated nylon. FIG. 1A illustrates that PEDOT-coated nylon shows much greater vis and NIR absorption compared to uncoated nylon. FIG. 1A also shows how over an IR source (human body), the coated fabric emits less thermal energy (appears colder) than the high emissivity surface of the uncoated nylon. These effects are quantified in FIG. 1B, where emissivity of the coated fabric (gray) and uncoated (black) is plotted against wavelength. The uncoated nylon fabric shows a behavior typical of traditional textiles: low emissivity (absorbance) in the visible and high emissivity in the IR. With a PEDOT coating, this optical behavior is reversed.

Figure 2:
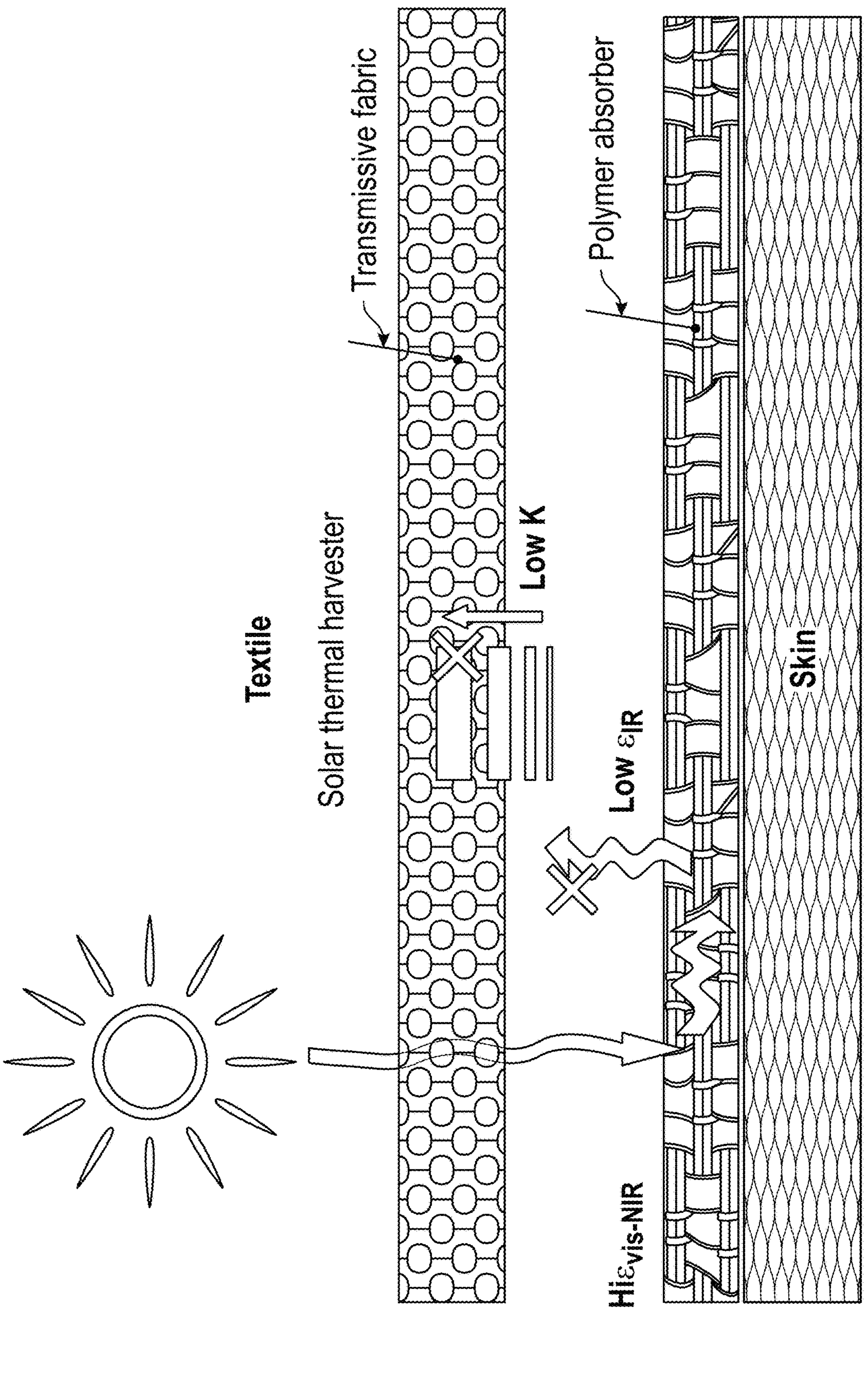
FIG. 2 illustrates the structure of a textile of the present disclosure and the corresponding functions of the transmissive layer and absorber layer. Light transmits through the top layer to be photothermally absorbed by the bottom layer. Heat loss by thermal emission and diffusion is suppressed by the low-IR emissivity polymer absorber and the insulating transparent fabric, respectively FIG. 3 the transmissive layer, which offers high transmission and forward scattering properties.

FIG. 2 illustrates the structure of a textile of the present disclosure. The textile can comprise a bottom layer that is a nylon fabric robustly vapor coated with a conjugated polymer, e.g., PEDOT, thus enabling selective absorption of visible light and suppression of IR emission. Without intending to limit to theory, it is believed that while PEDOT is an organic conductor, it achieves broadband vis-NIR light absorption due to plasmon (resonant surface electron) excitation near 540 nm with a high optical density K. At longer wavelengths into the IR, PEDOT is a reflector (a weak emitter). A PEDOT coating can efficiently manage radiative heat transfer between the body and the environment. Photothermal heat generated at the PEDOT-nylon absorber is further trapped by the top layer, a semi-transparent fabric. This lightweight fabric, which can be for example Agribon AG-19, is made of low optical density polypropylene fibers that forward-scatter visible light with about 85% transmission and more weakly transmits IR light with about 60% transmission. By confining solar thermal heat as both a diffusion and IR radiation barrier, AG-19 can act like a breathable greenhouse material.

Thus, the present disclosure describes a textile that can serve to not only limit dissipation of radiant body heat outward, but to also optimize absorption of ambient radiant energy inward. The power density of sunlight, for example, is sufficient (100-1000 $W/m^2$) to augment body heat (~70-120 $W/m^2$).

The photothermal absorber layer can be obtained by vapor coating of a conjugated polymer onto a fabric substrate. Conjugated polymers are a class of soft materials that can be coated onto complex surfaces characteristic of textiles via oxidative chemical vapor deposition. Polymers like poly(3,4-ethylenedioxythiophene) (PEDOT) exhibit high optical density with electromagnetic properties arising from pi-stacked conjugated units. While being lightweight and flexible, conjugated polymers can also be water-swellable. For example, vapor coating an electronic polymer poly(ethylenedioxythiophene) (PEDOT) onto nylon fabric can create a spectrally selective skin interface layer that strongly absorbs solar thermal heat and suppresses emission of infrared heat.

Figure 3:
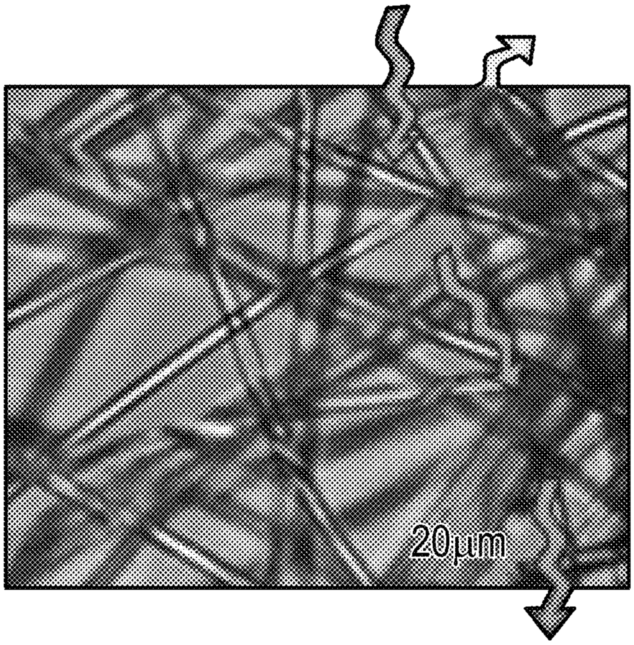
Figure 3:
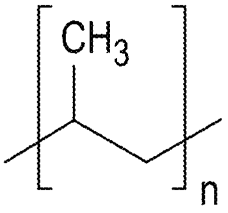

FIG. 3 illustrates the individual fibers of the transmissive layer. The transmissive layer comprises a plurality of spun-bonded polypropylene fibers. The chemical structure of polypropylene is provided in FIG. 3. Individual fibers are visualized in an optical transmission micrograph in FIG. 3.

The transmissive layer offers high transmissibility of visible light. For example, the transmissive layer can transmit light at about or at least 70%, 75%, 80%, 85%, 90%, 91%, 92%, 93%, 94%, 95%, 96%, 97%, 98%, or 99% or greater.

The transmissive layer comprises low optical density polypropylene fibers. The low optical density polypropylene fibers can provide forward-scattering behavior. Fiber diameter can be in the range of 9-10 microns, comparable to IR wavelengths and thus capable of strong Mie scattering. FIG. 3, for example, illustrates a transmissive layer having fibers that are about 9 to about 10 microns. The polypropylene material can be configured in forms that offer sustainability, durability, and are ultra-light weight. Along with the spectrally selective PEDOT-nylon fabric, the fabric transmissive layer operates differently than traditional textiles and has the potential to provide highly efficient thermoregulation.

Figure 4A:
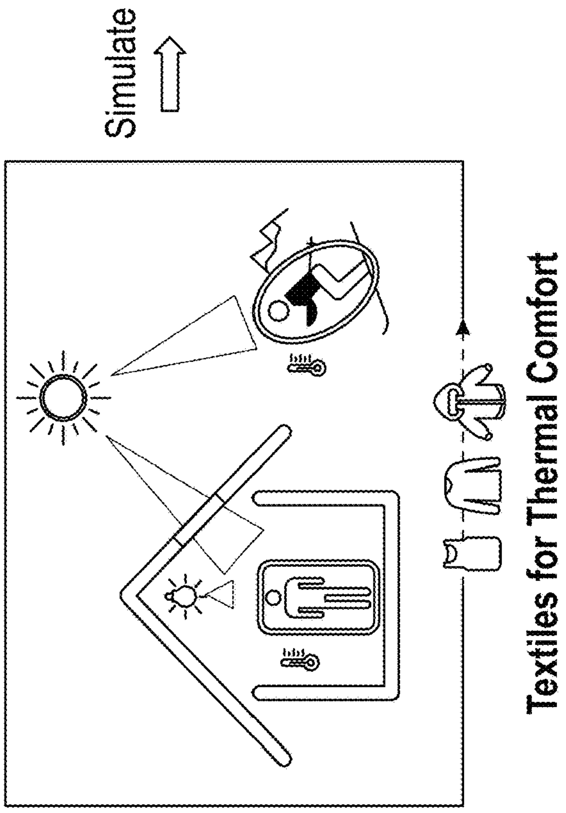
FIG. 4A-4C illustrate how the use of textiles for thermal comfort (a) indoors and outdoors, can be simulated by (b) an experimental test chamber. Such chamber was used to test (c) various textile samples.
Figure 4B:
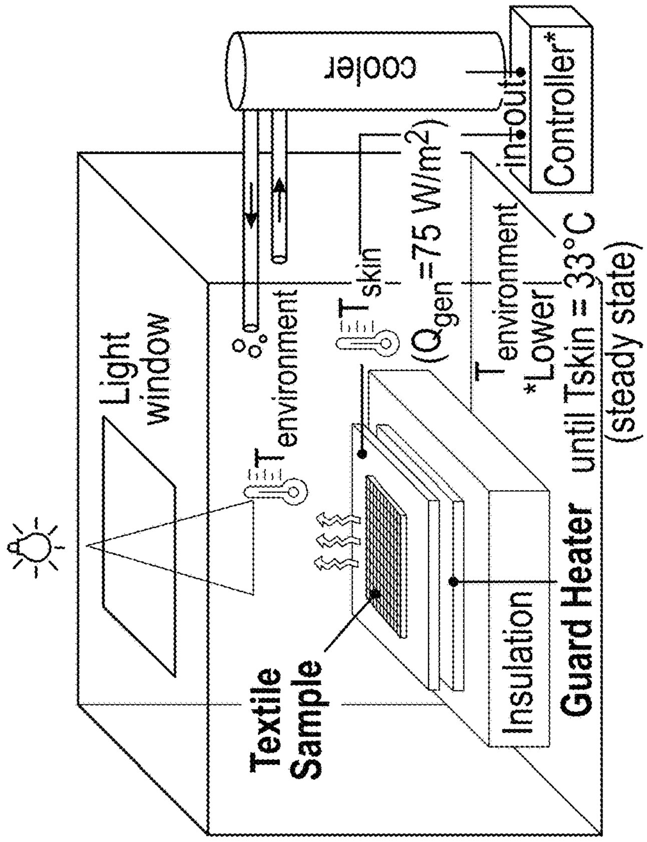
Figure 4C:
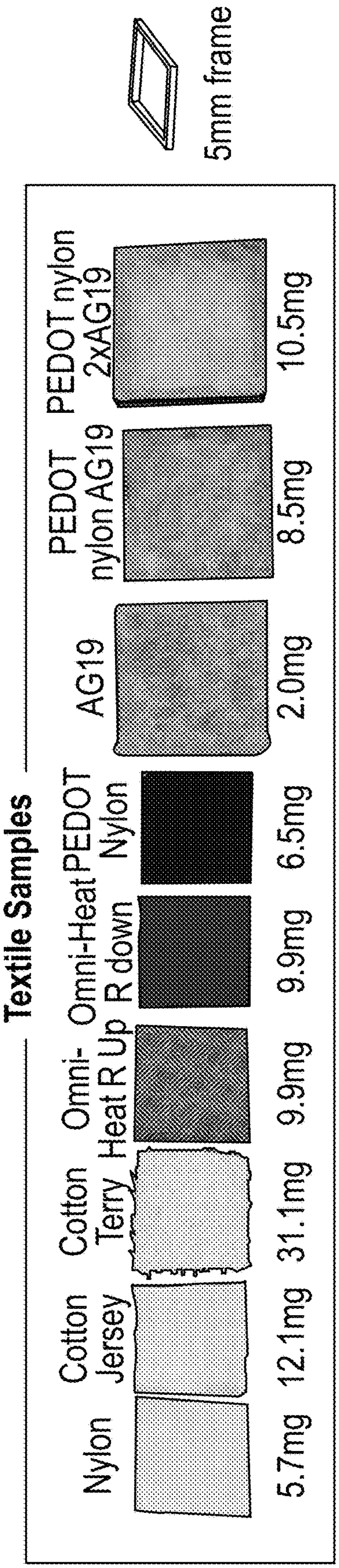

FIG. 4 illustrates how the use of textiles for thermal comfort outdoors and indoor can be simulated by an experimental model. FIG. 4A shows that solar light and other ambient light such as electrical lighting is available as radiant energy sources. A textile should limit the loss of body heat (75 W/m2 for an average adult at rest) to the environment so that a comfortable skin temperature (33° C.) is maintained at steady state. Loss of body heat to the environment can be simulated in a chamber depicted in FIG. 4B. For a given textile sample, the temperature of a skin heater with a constant output (75 W/m2) was monitored by a controller that lowers the environmental temperature until thermal comfort (Tskin=33° C.) is reached at steady state. A similar chamber design was previously used to evaluate passive heating solutions. The present experimental chamber differs in that it includes a window that allows for the introduction of environmental light (radiative energy) input to the textile-skin system. FIG. 4C presents various textiles tested, which represent a range of textiles of varying weights. A cotton jersey sample represents typical T-shirt material, while cotton terry is typical of heavier, warmer garments like a sweatshirt. Optically-active textiles were also tested: commercially available OMNI-HEAT™, which is a textile having multilayered aluminum dots; and spun-bonded polypropylene (AG-19). The OMNI-HEAT™ fabric was tested with the reflective face up (R up) and down (R down). The AG-19 was held by a 5 mm thick plastic frame for consistency across measurements.

FIG. 5 presents the results of the experimental model. The low temperature ratings of the textiles were measured in the environmental chamber and results for dark conditions are shown in FIG. 5A. The low emissivity fabrics—PEDOT-nylon and Omni-Heat (R up)—perform similarly to the cotton jersey fabric as has been previously demonstrated.

The thicker cotton terry and AG-19 fabrics offer more insulation and have lower environmental temperature ratings in the range of 18° C.

Figure 5A:
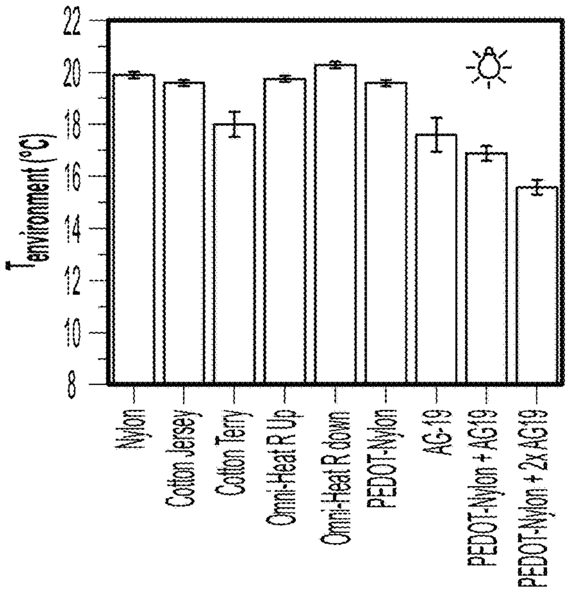
FIG. 5A-5D provide several charts illustrating the results of the experimental model (a) dark results as a bar chart, (b) light results as a bar chart, (c) stacked bar results, and (d) spectrum of the LED in the test chamber.
Figure 5B:
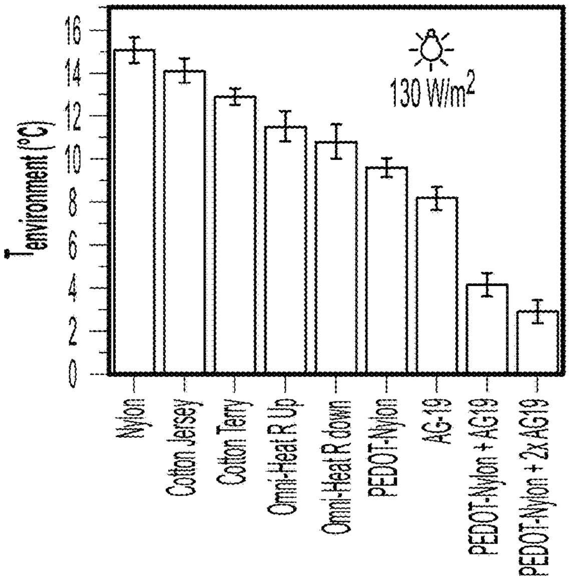
Figure 5C:
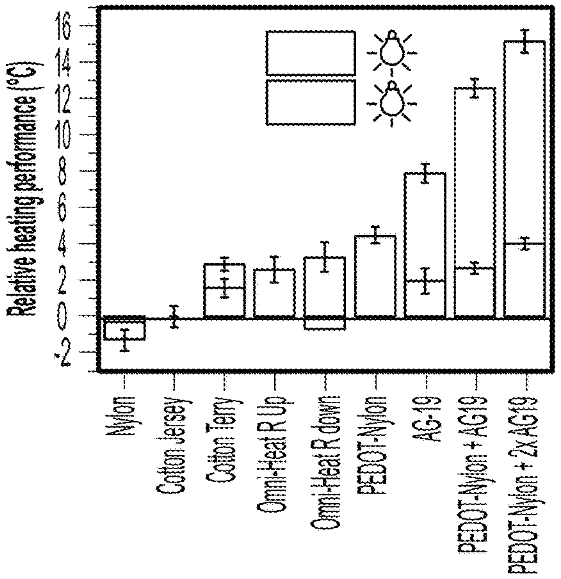
Figure 5D:
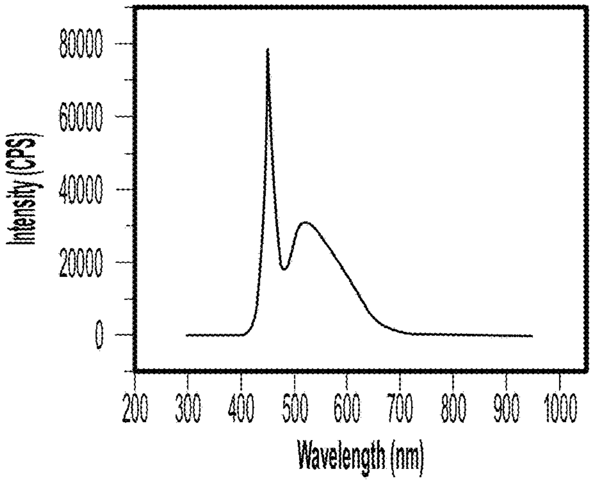

Under moderate illumination of 130 W/m2 (FIG. 5B), the performance of the textile samples varies more widely. While the PEDOT-nylon and Omni-Heat (R-up) fabrics perform similarly in dark conditions due to comparable thermal emissivity values, the PEDOT-nylon has a greater visible absorbance and so performs significantly better (9.6° C. versus 11.5° C.) under illumination. Compared to PEDOT fabrics, other metal-coated textiles, like Omni-Heat, should show poor solar thermal heating due to the higher resonant frequency of most metals (typically in the UV-visible range). Individually, AG-19 also performs well (8.2° C.) but when stacked in the absorber-transmitter structure, the complementary optical functions of the PEDOT-nylon and AG-19 yield a more dramatic heating effect. The bilayer textile has a temperature rating that extends 10° C. lower than the cotton jersey fabric (4.2° C./~40° F. versus 14.1° C./~60° F.) while weighing 30% less. With an additional layer of AG-19, the performance improves more modestly (extending to 2.9° C.), perhaps due to the increased opacity of the transmissive layer. Taking the temperature rating of the cotton jersey fabric as a baseline for the other measurements allows comparison of textile performance in both light and dark conditions (FIG. 5C). While the thick, insulating cotton terry fabric shows good performance in dark conditions (+1.6° C. relative to cotton jersey), it has relatively weak performance in light conditions (+1.3° C.). This is representative of traditional textiles—thick, opaque insulation that limits heat dissipation outward will also limit photothermal heat transfer inward. On the other hand, the bilayer textile excels in both dark (+2.7° C.) and light (+9.9° C.) conditions due to the insulating yet light-transmitting AG-19 layer. FIG. 5D illustrates the spectrum of the led used in the chamber experiment.

Figure 6A:
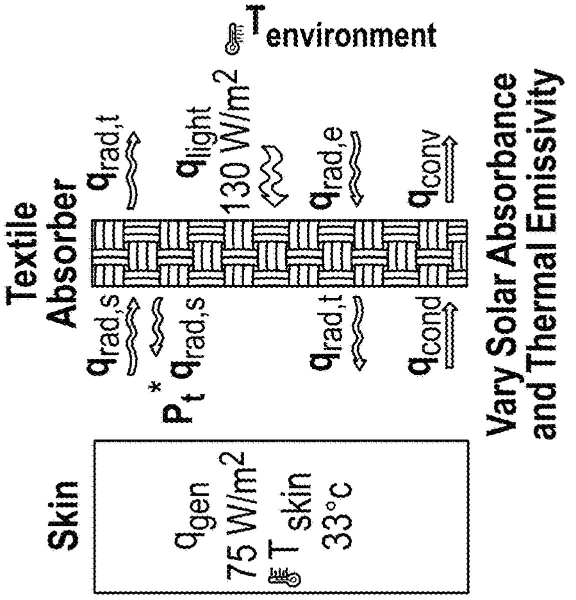
FIG. 6A-6C illustrate a model for the impact of optical properties on textile thermoregulation. Specifically, (a) the interplay between a textile absorber relative, the skin and the environment per a steady-state heat transfer model of the skin-textile system includes incident radiation (130 W/m$^2$) and a natural convection coefficient that varies with the skin-environment temperature difference; (b) results of the model plotting Tenvironment vs solar absorbance vs thermal emissivity; (c) radiant light source changes based on the season.
Figure 6B:
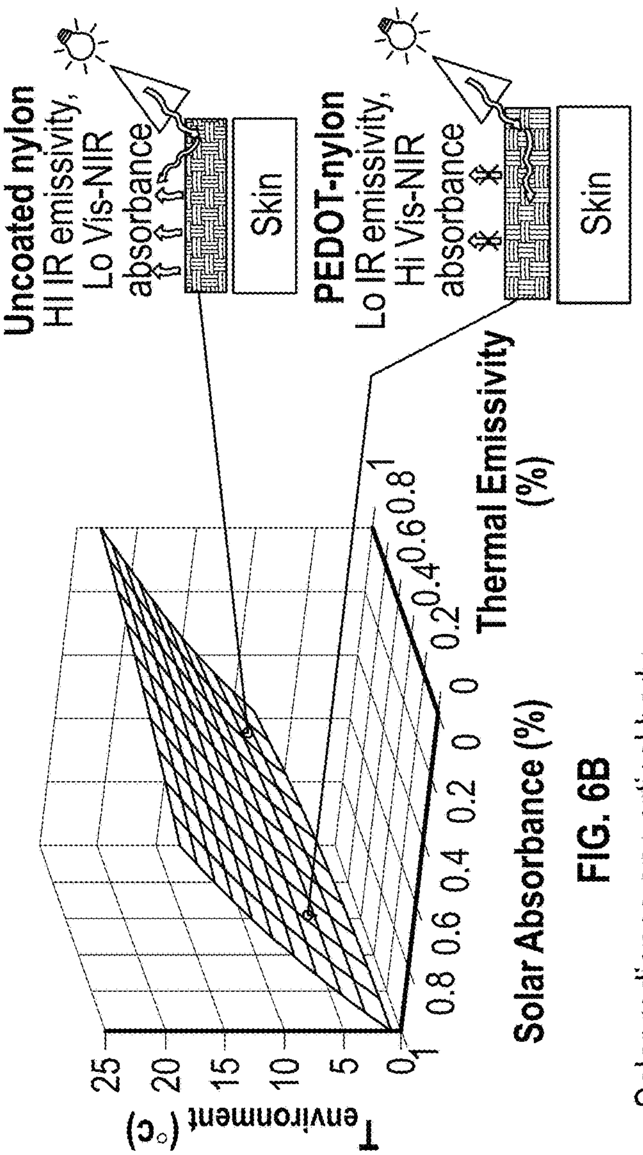
Figure 6C:
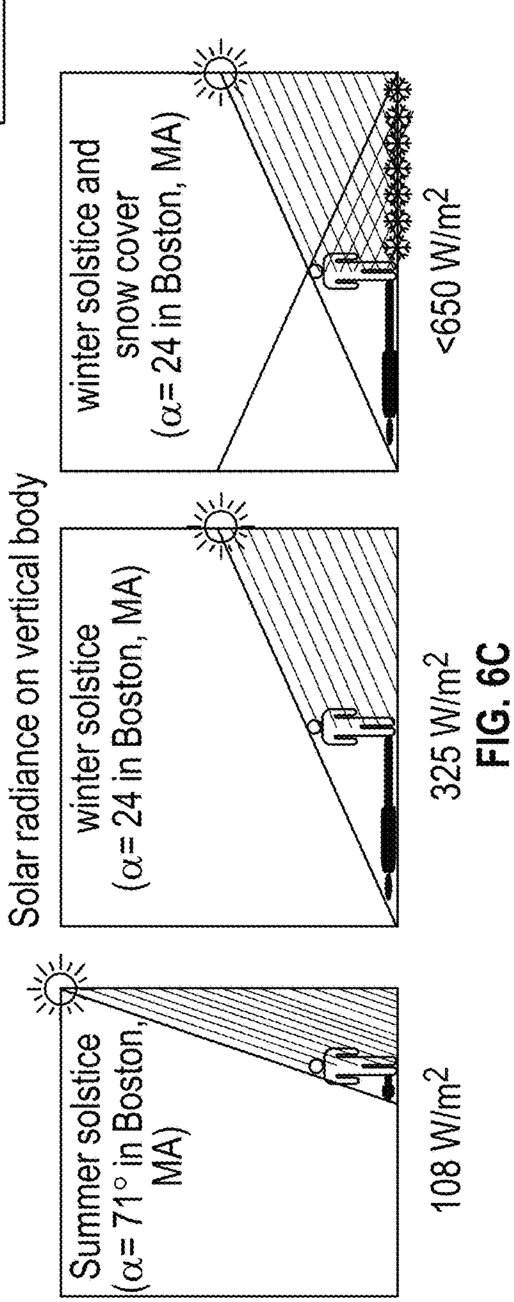

FIG. 6 illustrates a model for the impact of optical properties on textile thermoregulation for a moderate light intensity of 130 W/m2 and based on outdoor radiant light during various seasons. FIG. 6A provides a schematic of the steady-state heat transfer model for a single-layer textile. $T_{environment}$ is calculated as a function of textile spectral selectivity given the thermal comfort condition ($T_{skin}$=33° C.). The impact of IR and visible optical properties on personal heating in the presence of moderate light intensity was modeled. The steady-state heat transfer model of the skin-textile system includes incident radiation (130 $W/m^2$) and a natural convection coefficient that varies with the skin-environment temperature difference (FIG. 6A). The results of the model are shown in FIG. 6B and experimental data points of uncoated and PEDOT coated nylon are overlaid. The performance of radiative heated textile is higher at greater solar absorbance and lower thermal emissivity. At 130 $W/m^2$, the dependence of environmental temperature on solar absorbance is roughly comparable to that of thermal emissivity; however, at greater radiance (325 $W/m^2$), solar absorbance becomes the dominant factor. FIG. 6C illustrates how radiant light source changes based on the season. Approximation of solar radiance on a vertical body in, for example, Boston, MA. The coldest season corresponds with the maximum radiance due to reduced solar elevation; snow cover (albedo >90%) as much as doubles light exposure. The human body is taken as a vertical cylinder and incident radiance is divided by total surface area (typically 1.8 m2).

To understand realistic sunlight utilization, the human body was approximated as a vertical cylinder and normal incident radiance per total surface area (typically 1.8 m2 for adults) was calculated across the year. For solar-powered personal heating, a convenient coincidence is that the coldest season corresponds with the maximum solar radiance on a vertical body due to the reduced solar elevation. In Boston, MA, for example, the on-body radiance of direct sunlight increases from about 108 W/m2 at the summer solstice to about 325 W/m2 at the winter solstice. At this low angle, snow cover also becomes highly reflective and can further double light exposure to as much as 650 W/m2, meaning that the available wintertime solar radiance is about 3-6 times larger than the body heat generated by a moderately active adult (70-120 W/m2). The bulky, opaque nature of winter outerwear assures low utilization of this power source. By harnessing sunlight on the other hand, the solar textile described here promises to efficiently heat the body with an ultra-light weight design. Indoors, a light capturing textile can support the development of passive solar architectures as personal heating and design elements, as well as be powered by existing indoor light fixtures capable of the lower radiance levels modeled here.

FIG. 7 illustrates how wearability can be characterized for a given textile. Everyday clothing is expected to be comfortable, breathable, and washable. The optically-active textiles presented herein were also evaluated for these functions.

Figure 7A:
FIG. 7A-7D illustrate how wearability can be characterized for a given textile: (a) draping, (b) pleating, (c) before and after washing, and (d) breathability.
Figure 7B:
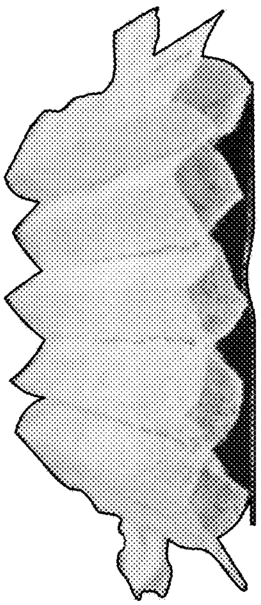
Figure 7C:
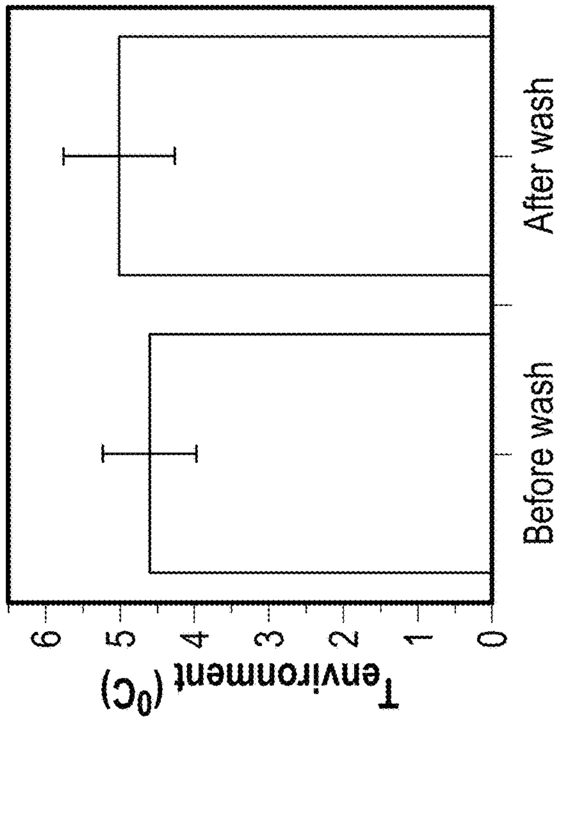
Figure 7D:
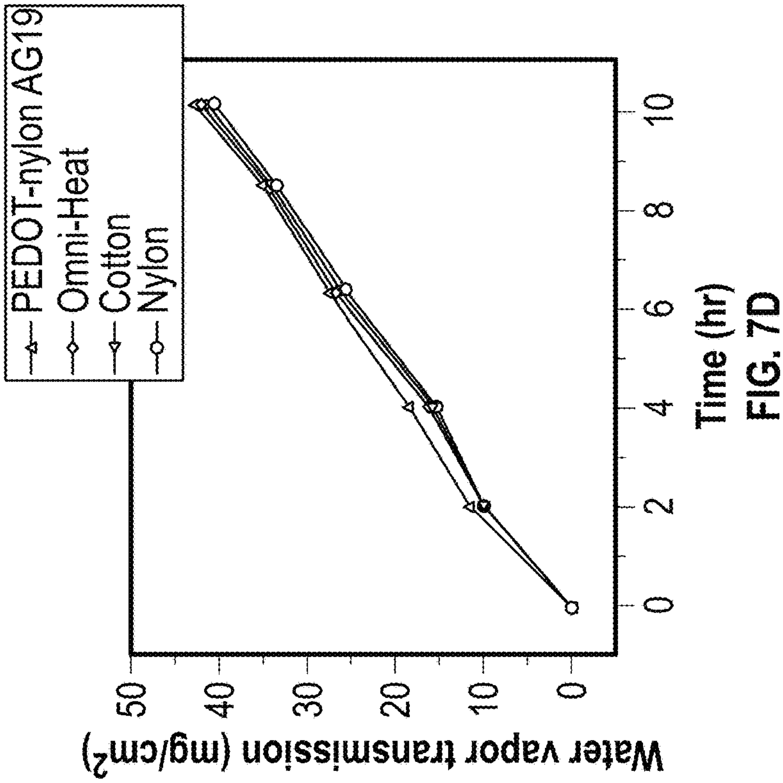

Despite being non-woven, the AG-19 transmitter fabric has many familiar textile qualities that make it suitable for garments and apparel, upholstery, and décor. The non-woven material has a similar drape to traditional woven textiles (FIG. 7A) and may be sewn and ironed without damage. To demonstrate use in wearable applications, a multi-layer textile was made by sewing two layers of AG-19 and ironing pleats to form insulating baffles. PEDOT-nylon was then sewn to the bottom to make a self-supported solar thermal textile (FIG. 7B). This textile performs similarly to the previously characterized bilayer structure and, importantly, is stable after washing (FIG. 7C). A water vapor transmission test across an AG-19/PEDOT-nylon stack reveals that this bilayer is as breathable as other common fabrics used in the study (FIG. 7D). The diffuse open mesh of the AG-19 fabric is breathable, and the conformal coatings of PEDOT on nylon are hydrophilic.

Using similar design methods, it is also possible adapt our strategy to radiative cooling and access a reflector-emitter structure. By rejecting solar heat and dissipating thermal heat through the atmospheric window, such a structure allows adaptive living in extremely hot conditions. The material properties and vapor deposition of PEDOT can also enable other kinds of optical control beyond the photothermal effect shown here. When used with specific surface geometries, the plasmon-coupled light interactions of PEDOT can also be directed to produce the high reflectivity needed for daytime radiative cooling. The oxidative vapor deposition process used in this work can also be uniquely suited for such optical engineering purposes. Electronic polymer coatings of precise thickness can be conformally deposited over complex surface arrays which may possess features ranging in size from sub-micron to micron. This alternative adaption involves designing a transparent thermal emitter layer. While the polypropylene fibers here primarily serve to transmit visible light, Mie scattering theory also can inform optical tuning toward high IR emittance by adjusting fiber size and geometry to achieve dielectric resonance at IR frequencies.

The solar thermal textile presented here is a flexible, lightweight platform for harvesting radiative energy.

Indoors, this technology can enable efficient thermoregulation by local, low power radiant heaters (i.e. LEDs) as well as support the design of passive solar architectures. Outdoors, a lightweight solar textile will make winterwear more comfortable and enable passively heated shelters for adaptive living in harsher climates. As the energy and environmental crises progress, reinventing textiles with polymer-enabled light and heat control will prove increasingly useful.

EXAMPLES

Various embodiments of the present invention can be better understood by reference to the following Examples which are offered by way of illustration. The present invention is not limited to the Examples given herein.

Materials

Agribon AG-19 was purchased from Johnny's Selected Seeds. Ripstop nylon, cotton terry, and cotton jersey were purchased from Joann's Fabrics. Samples were cut to 5×5 cm dimensions. Agribon samples were cut to 6×6 cm dimensions and supported by a 5 mm thick plastic frame. Omni-Heat samples were cut from the inside of a Columbia brand jacket.

PEDOT Film Deposition

Films of PEDOT-Cl were deposited onto ripstop nylon using a custom-built reactor described in previous reports. First, 3,4-ethylenedioxythiophene (EDOT) (95%, TCI America), was reacted with iron (III) chloride ($FeCl_3$) (97%, Sigma Aldrich) in the vapor phase at low pressures maintained at approximately 750 m Torr. EDOT was evaporated at 95° C. and delivered into the chamber via a needle valve (Swagelok SS-4JB) opened a quarter turn. The volume of EDOT in the glass bulb was monitored over the course of the deposition to ensure a monomer flow rate of 5-10 sccm. $FeCl_3$ was sublimed by heating to >205° C. in a Luxel RADAK II furnace. The substrate stage was heated to 150° C. over the course of the deposition.

Real-time film growth rate was monitored by a quartz crystal microbalance (QCM) located inside the chamber. Due to the different positioning of the QCM relative to the sample stage, a correction factor is needed to account for film growth rate variations. By measuring actual film thickness post-deposition using a Dektak profilometer, a tooling factor of 0.24 was determined. Film growth rate was kept at 2 nm/s. After the desired film thickness was reached, the sample stage was allowed to cool below 60° C. under vacuum. To remove residual iron salts and oligomers, samples were immediately rinsed with dilute acid (0.5 M HCl) for 30 minutes followed by a methanol rinse.

Environmental Chamber and Thermoregulation Characterization

An insulated chamber 12"×12"×9" was made with R-5 insulation board. Two silicone heaters (Tempco, 5×5 $cm^2$) were inset into a block of insulation with thermistors placed atop the skin heater and between the skin and guard heater. Another thermistor set one inch above and one inch to the side of the skin monitored environment temperature. This thermistor was shielded with foil to measure the true air temperature under irradiance. A cooler consisting of a pump circulating chamber air through a filled 0.5 L liquid nitrogen Dewar was used. An Adafruit Feather MO microcontroller monitored skin temperature and adjusted the environmental temperature until $T_{skin}$=33° C. using hysteresis control. The guard heater was set to maintain the same temperature within 0.3° C. as the skin heater, ensuring 1D heat transport upward. A steady state measurement was taken such that the skin temperature varied no more than 0.3° C. over the course of at least 15 minutes. Error bars provided are the standard deviation of environmental temperature during the measurement. For light conditions, a Feit 33 W/300 W equivalent LED bulb was used; light intensity was measured with a light meter placed in the same position as the skin heater. The spectrum was measured with a fluorimeter (Horiba Scientific) (FIG. 5D).

Optical Characterization

A FLIR TG165 was used to measure the infrared properties of the nylon, PEDOT-nylon, and AG-19 and capture thermal images. A fabric sample was placed on a heated (60° C.) 15×15 cm copper block covered with 3M Super 88 electrical tape (ε=0.95) and the apparent emissivity (ε) was measured assuming the fabric samples (<60 μm thick) reached 60° C. Transmissivity (τ) was measured by covering the FLIR detector with the fabric samples, measuring the apparent temperature of the 60° C. block from 6 cm away, and applying Equation 2 where $T_{obj}$ is the temperature of the fabric sample and $T_{amb}$ is the ambient temperature. Transmissivity was subtracted from apparent emissivity to obtain the true emissivity. Finally, reflectivity (ρ) was calculated from true emissivity and transmissivity by Kirchhoff's law. For our heat transfer analyses, we then assume that transmitted light is effectively absorbed (as it would be by the skin) so emissivity is reported and used assuming opaque samples. The optical transmission micrograph was taken using a Nikon Ti2 Eclipse with a 40× objective and a 440 nm source.

$$\tau = \frac{T^4_{obj,apparent} - T^4_{amb}}{T^4_{obj,real} - T^4_{amb}} \tag{1}$$

Solar Radiance on a Vertical Human Body

To make the on-body radiance estimation, the human body was approximated by a vertical cylinder of height 1.7 m and surface area 1.8 $m^2$. Similar approximations have been previously made. Extraterrestrial radiance values on a vertical surface on June $21^{st}$ and December $21^{st}$ in Boston, MA were obtained using the SOLPOS function (NREL). On-body radiance is then approximated as 80% of extraterrestrial radiance on the projected vertical area ($A_{xy}$=0.568 $m^2$) per total surface area ($A_{tot}$=1.8 $m^2$) as in Equation 2.

$$R_{body} = \frac{0.8 * R_{extr} * A_{xy}}{A_{tot}} \tag{2}$$

Wearability Characterization

The Agribon AG-19 fabric was sewn with cotton thread and ironed to form pleated baffles. The PEDOT-nylon was then sewn to the bottom. During testing, the open ends of the baffles were covered with plastic. Washing was performed in clean water with stirring for 3 hours. Breathability was characterized by sealing textile sample discs (3.1 $cm^2$) to vials containing 3 g of Dri-Rite. Placed in a sealed chamber with a humidity of approximately 60%, the mass change of the vials was recorded at two-hour intervals. The mass gain was then divided by the surface area of the samples to obtain the water vapor transmission rate.

Heat Transfer Model Assumption

To evaluate the impact of fabric optical properties on personal heating, a one-dimensional steady-state heat transfer model analysis was performed. This model is based on the control volume and energy balance analysis of heat radiation, conduction, and convection between the ambient environment and clothed human body. For simplification, the following assumptions are given:

1) The fabric is assumed to be opaque.
2) The temperature and the metabolic heat generation rate of the human skin is constant.
3) Heat convection is uniform between the ambient environment and the body.
4) The heat transfer between the clothed human body and the environment is one-dimensional transport through infinite parallel plans.
5) There is no convection between the skin and fabric.
6) Air gap thickness is small (1.4 mm) and homogeneous.
7) The material optical properties are constant.
8) The environment and the skin are assumed to be the ideal black bodies.
9) The temperature of the textile is assumed to be uniform.
10) Assuming this is a steady-state heat transfer process, no heat accumulation occurs.
11) Assuming no forced convection between fabric and environment.
12) Assuming a personal thermal comfort condition (constant $T_{skin}$=33° C.) and evaporative heat loss occurs.

In prior works, the natural convective heat transfer coefficient (NCHTC) was taken as a constant. Since the temperature range in our study is significantly wider than in previous, the dependence of NCHTC on ΔT (the difference between $T_t$ and $T_e$) was included in the model. In our case, we varied NCHTC for a horizontal hot plate based on the Eqn. S1 adapted from W. H. McAdam.

$$h = K * \Delta T^{\left(\frac{1}{2}\right)} \tag{S1}$$

The exponent ⅓ is determined by the Rayleigh number (Ra) which for our system is estimated to be around $2\times10^9$ by Equation S2. The parameter names and values used for calculation of Ra are listed in Table 2:

$$Ra = \frac{Cp * L3 * \rho 2 * g * \Delta T * \beta}{K * \mu} \tag{S2}$$

The constant K in Eqn. S1 was estimated to be 2.41 by taking h (ΔT=10)=4, which aligns with previous literature. The effective length is equal to the area of the hot plate divided by the perimeter.

Heat Transfer Model Formulation

This model relates fabric optical and thermoregulation properties. Steady state energy (heat) balances were made at the skin surface and textile surface.

At skin surface:

$$q_{gen} - q_{rad,s} * (1 - \rho_t) + q_{rad,t} - q_{cond} = 0 \tag{3}$$

At textile surface:

$$q_{rad,s} * (1 - \rho_t) - 2 * q_{rad,t} + q_{rad,e} * (1 - \rho_t) + q_{cond} - q_{conv} + a * Q_{light} = 0 \tag{14}$$

$q_{gen}$-human metabolic heat generation rate; $q_{conv}$-convective heat flux between the textile and ambient environment; $q_{cond}$-conductive heat flux from the skin to the textile; $q_{rad,s}$-radiative heat flux from the human body; $q_{rad,e}$-radiative heat flux from the environment; $q_{rad,t}$-radiative heat flux from the textile.

According to the Stefan-Boltzmann law, Newton's law of cooling and Fourier's law, the conductive, convective, and radiation term can be represented as:

$$q_{rad,s} = \mathcal{E}_s * \sigma * T_s^4 \tag{5}$$

$$q_{rad,e} = \mathcal{E}_e * \sigma * T_e^4 \tag{6}$$

$$q_{rad,t} = \mathcal{E}_t * \sigma * T_t^4 \tag{7}$$

$$q_{cord} = \left(k_a / t_a\right) * (T_s - T_t) \tag{8}$$

$$q_{conv} = 2.41 * (T_s - T_t)^{(V_s)} * (T_s - T_t) \tag{9}$$

Based on the energy balance analysis on the controlled volume, the two unknowns, $T_e$ and $T_t$ can be solved when the input $\varepsilon_t$ and α vary from 0 to 1. The calculation and data visualization are completed on Matlab (version R2018b (MathWorks, Inc)). This generated a 3-dimensional plot showing the temperature map at different optical properties of the textile. Two experimental data points for nylon and PEDOT-nylon are also plotted.

TABLE 1

Input parameters and their nomenclature used for heat transfer model analysis.

| Symbol | Definition | Value | Unit |
|---|---|---|---|
| $q_{gen}$ | metabolic heat generation rate per unit area | 75 | $W/m^2$ |
| $Q_{light}$ | Solar light intensity | 130 | $W/m^2$ |
| T | Temperature | Skin, $T_s$ = 306.15<br>Environment, $T_e$<br>Textile, $T_t$ | K |
| ta | Air gap thickness | 1.4 | mm |
| ka | Thermal conductivity of air | 0.026 | W/m * K |
| σ | Stefan-Boltzmann constant | $5.67 * 10^{-8}$ | $W/m^2 * K^4$ |
| ε | IR emissivity | Skin, $\varepsilon_s$ = 0.98<br>Environment, $\varepsilon_e$ = 1<br>Nylon, $\varepsilon_t = 1-\rho_t$ = 0.65<br>PEDOT/Nylon,<br>$\varepsilon_t = 1-\rho_t$ = 0.48 | unitless |
| ρ | IR reflectivity | Nylon, $\rho_t$ = 0.2<br>PEDOT-nylon $\rho_t$ = 0.46 | |
| α | Visible light absorptivity | Nylon, α = 0.47<br>PEDOT-nylon, α = 0.91 | |

TABLE 2

Properties of ambient air at 30° C. and atmospheric pressure.

| Parameter Name | Value | Unit |
|---|---|---|
| $C_p$, specific heat capacity | $1.0065 * 10^3$ | J/kg · K |
| K, heat conductivity | 0.026 | W/m · K |
| M, dynamic viscosity | $1.868 * 10^{-5}$ | kg/m · s |
| ρ, density | 1.1649 | $kg/m^3$ |
| g, earth gravity acceleration | 9.81 | $m/s^2$ |
| β, thermal expansion coefficient | $3.32 * 10^{-3}$ | $K^{-1}$ |
| L, effective length | 1.25 | unitless |
| ΔT, temperature difference between air and hot surface | 10 | |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Exemplary Aspects:

The following exemplary aspects are provided, the numbering of which is not to be construed as designating levels of importance:

Aspect 1 provides a textile comprising:

a photothermal absorber layer, which comprises a conjugated polymer; and a transmissive layer, which comprises fibers that forward scatter incident visible light with a transmission of 60% or greater.

Aspect 2 provides the textile of Aspect 1, wherein the conjugated polymer is a polythiophene.

Aspect 3 provides the textile of Aspect 1, wherein the conjugated polymer is PEDOT.

Aspect 4 provides the textile of Aspect 1, wherein the photothermal absorber layer comprises a woven, polymer textile.

Aspect 5 provides the textile of Aspect 1, wherein the photothermal absorber layer comprises nylon fabric.

Aspect 6 provides the textile of Aspect 1, wherein the photothermal absorber layer comprises a nylon fabric having an approximately 1 micron thick coating of PEDOT.

Aspect 7 provides the textile of Aspect 1, wherein the photothermal absorber layer comprising the conjugated polymer absorbs more photothermal energy, and emits less thermal energy, each relative to an otherwise equivalent photothermal absorber layer lacking the conjugated polymer.

Aspect 8 provides the textile of Aspect 1, wherein the photothermal absorber layer has an emissivity in the visible-NIR range of greater than 70% and an emissivity in the IR range of less than 60%.

Aspect 9 provides the textile of Aspect 1, wherein the photothermal absorber layer has an emissivity in the visible-NIR range of greater than 80% and an emissivity in the IR range of less than 60%.

Aspect 10 provides the textile of Aspect 1, wherein the photothermal absorber layer has an emissivity in the visible-NIR range of greater than 95% and an emissivity in the IR range of less than 60%.

Aspect 11 provides the textile of Aspect 1, wherein the transmissive layer comprises a non-woven, polymer textile.

Aspect 12 provides the textile of Aspect 1, wherein the transmissive layer comprises polypropylene.

Aspect 13 provides the textile of Aspect 1, wherein the transmissive layer is spun-bonded polypropylene.

Aspect 14 provides the textile of Aspect 1, wherein the transmissive layer comprises two or more layers which together provide one or more insulating chamber comprising air.

Aspect 15 provides the textile of Aspect 1, wherein the transmissive layer has transmissibility of greater than 70% in the visible-NIR range.

Aspect 16 provides the textile of Aspect 1, wherein the transmissive layer has transmissibility of greater than 80% in the visible-NIR range.

Aspect 17 provides the textile of Aspect 1, wherein the transmissive layer has transmissibility of greater than 90% in the visible-NIR range.

Aspect 18 provides the textile of Aspect 1, wherein the transmissive layer has an emissivity in the IR range of less than 60%.

Aspect 19 provides the textile of Aspect 1, wherein the fibers have a diameter of from about 5 microns to about 15 microns.

Aspect 20 provides the textile of Aspect 1, wherein the fibers have a diameter of from about 9 microns to about 10 microns.

Aspect 21 provides the textile of Aspect 1, wherein the fibers are non-woven.

Aspect 22 provides the textile of Aspect 1, wherein the fibers are spun-bonded polypropylene fibers.

Aspect 23 provides the textile of Aspect 1, wherein the photothermal absorber layer further comprises a phase change material.

Aspect 24 provides the textile of Aspect 1, wherein the photothermal absorber layer further comprises poly(ethylene glycol)-1000.

Aspect 25 provides the textile of Aspect 1, wherein the transmissive layer further comprises one or more insulating air pocket.

Aspect 26 provides the textile of Aspect 1, suitable for use in garments, apparel, upholstery, linens, and window treatments.

Aspect 27 provides a wearable, comprising a textile having a photothermal absorber body-facing layer, which comprises a conjugated polymer; and a transmissive outer-facing layer, which comprises fibers that forward scatter incident visible light with a transmission of 60% or greater.

Aspect 28 provides the wearable of Aspect 27, which is in the form of a jacket, shirt, pants, snow suit, vest, poncho, gloves, or hat.

Aspect 29 provides the wearable of Aspect 27, which is in the form of winter wear.

Aspect 30 provides a method of preparing a textile, comprising:

vapor film deposition of a conjugated polymer onto a first fabric;

securing the first fabric to a second fabric, wherein the second fabric comprises fibers that forward scatter incident visible light and has a transmission of 60% or greater.

What is claimed is:

1. A photothermal textile comprising:

a photothermal absorber layer, which comprises a conjugated polymer; and a transmissive layer, which comprises fibers that forward scatter incident visible light with a transmission of 60% or greater, wherein the textile is passive and configured to harvest thermal energy from light without photovoltaics.

2. The textile of claim 1, wherein the conjugated polymer is a polythiophene.

3. The textile of claim 1, wherein the photothermal absorber layer comprises a woven, polymer textile.

4. The textile of claim 1, wherein the photothermal absorber layer comprises a nylon fabric having an approximately 1 micron thick coating of PEDOT.

5. The textile of claim 1, wherein the photothermal absorber layer has emissivity in the visible light range that is greater than an emissivity in the IR range of the photothermal absorber layer.

6. The textile of claim 1, wherein the photothermal absorber layer has an emissivity in the visible-NIR range of greater than 70% and an emissivity in the IR range of less than 60%.

7. The textile of claim 1, wherein the photothermal absorber layer has an emissivity in the visible-NIR range of greater than 95% and an emissivity in the IR range of less than 60%.

8. The textile of claim 1, wherein the transmissive layer comprises a non-woven, polymer textile.

9. The textile of claim 1, wherein the transmissive layer is spun-bonded polypropylene.

10. The textile of claim 1, wherein the transmissive layer comprises thermally-insulating chambers comprising air.

11. The textile of claim 1, wherein the transmissive layer has transmissibility of greater than 70% in the visible-NIR range.

12. The textile of claim 1, wherein the transmissive layer has transmissibility of greater than 90% in the visible-NIR range.

13. The textile of claim 1, wherein the transmissive layer has an emissivity in the IR range of less than 60%.

14. The textile of claim 1, wherein the fibers have a diameter of from about 5 microns to about 15 microns.

15. The textile of claim 1, wherein the fibers have a diameter of from about 9 microns to about 10 microns.

16. The textile of claim 1, wherein the photothermal absorber layer further comprises a phase change material.

17. The textile of claim 1, wherein the photothermal absorber layer further comprises poly(ethylene glycol)-1000.

18. The textile of claim 1, wherein the transmissive layer is baffled.

19. A photothermal wearable, comprising a textile having a photothermal absorber body-facing layer, which comprises nylon fabric having an approximately 1 micron thick coating of PEDOT; and a transmissive outer-facing layer, which is spun-bonded polypropylene having disorganized fibers having a diameter of about 1 micron to about 20 microns and that forward scatters incident visible light with a transmission of 60% or greater, wherein the textile is passive and configured to harvest thermal energy from light without photovoltaics.

20. A method of preparing a photothermal textile, comprising:

vapor film deposition of a conjugated polymer onto a first fabric;

securing the first fabric to a second fabric, wherein the second fabric comprises fibers that forward scatter incident visible light and has a transmission of 60% or greater, wherein the textile is passive and configured to harvest thermal energy from light without photovoltaics.

* * * * *